May 10, 1927.  1,628,546

A. W. KOCH

FERTILIZER DISTRIBUTING MACHINE

Filed Feb. 24, 1925

Inventor:
August Wilhelm Koch
per:
Dr. Adolph Zimmermann
Attorney

Patented May 10, 1927.

1,628,546

UNITED STATES PATENT OFFICE.

AUGUST WILHELM KOCH, OF HANOVER-KLEEFELD, GERMANY.

FERTILIZER-DISTRIBUTING MACHINE.

Application filed February 24, 1925, Serial No. 11,294, and in Germany March 1, 1924.

This invention refers broadly to fertilizer strewing and distributing machines, and it is one of the main objects of my invention to make provision for a very thorough comminution and an increased uniformity of distribution of the fertilizing material, and with these and other objects in view means are provided in connection with the ordinary discharging rollers to so arrange the distance and the speed of said rollers that the ordinarily somewhat moist and sticky material is immediately disintegrated and lacerated by a judicious differentiation of the speed of the rollers, so as to prevent condensing and caking action otherwise caused by such discharging rollers. With these ends in view my invention also provides disintegrating knives or the like having a peculiar planing, while at the same time comminuting action, combined with means of preventing the retaining and adhesion of the particles produced.

As regards the rollers mounted at the discharge end of the machine, and comprising the usual combination of discharging roller proper, counterroller and strewing or distributing roller the two rollers last mentioned are disposed laterally of the discharge roller and at such distances from each other that the material ejected by the slowly rotating discharge and counterrollers is caused to drop onto the longitudinal ribs or projections of the preferably more quickly rotated strewing or distributing roller below the same, and usually partly surrounded by a trough, means being provided of crushing, comminuting and triturating by the action of the ribs both the fertilizer within reach of the distributing or strewing roller as well as the material adhering to the discharge roller by a sweeping and planing action and of detaching and ejecting the same.

In a preferred form of construction of the invention the longitudinal ribs of the strewing or distributing roller are distinguished by serrated outer edges, the indentations of these edges being alternatingly or staggeringly arranged, if desired, for increasing the comminuting action. By the combination of means according to this invention an extremely fine and substantially uniform distribution of all kinds of fertilizing material and of manure is produced.

Figure 1:
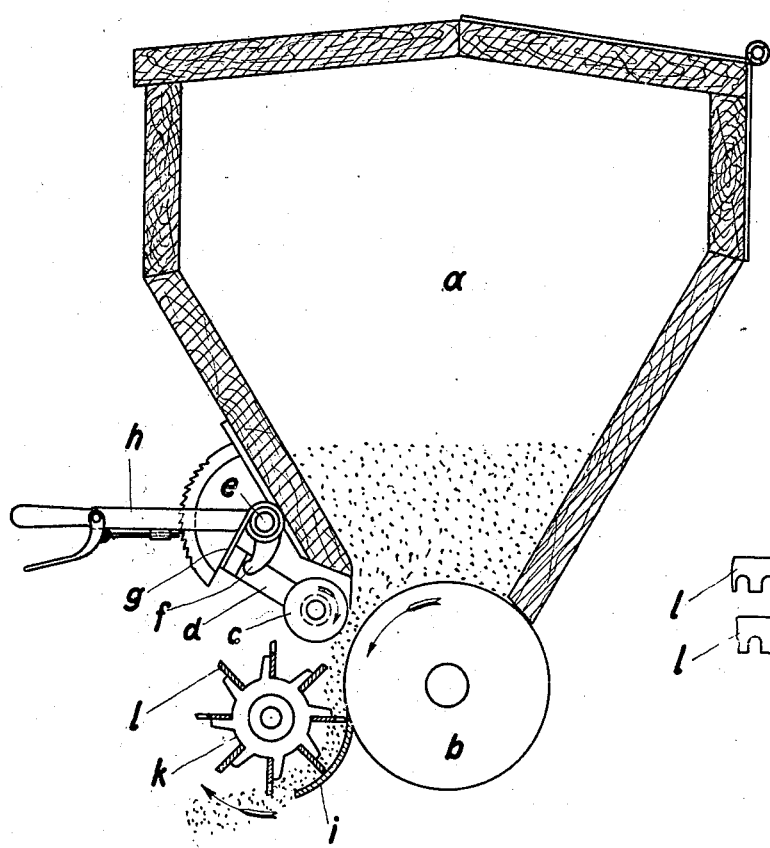
Figure 2:
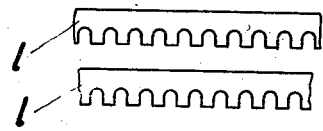
Figure 3:
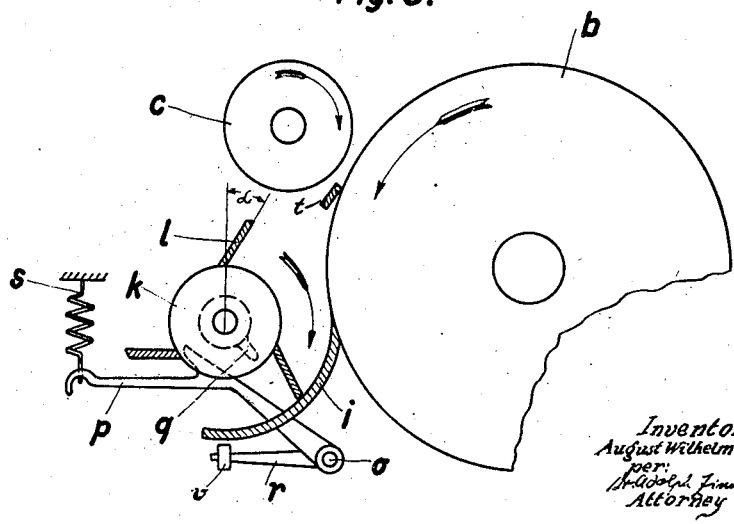

The invention will be more specifically described with reference to the accompanying drawing, showing by way of exemplification an embodiment of the principles of the invention in Figure 1, in transverse section. Figure 2 shows a detail in elevation representing a particular formation of the longitudinal ribs of the strewing or distributing roller. Figure 3 shows in a conventional manner the lower portion of a machine of the kind referred to in a somewhat modified construction.

Below the ordinarily substantially longitudinal opening of the downwardly tapering hopper $a$ the discharging roller $b$ is arranged adapted to cooperate with the counterroller $c$ and in parallel spaced relation thereto. The axial distance of these two rollers is adjustable by mounting the bearings of the counterroller $c$ on slides or tension rods $d$ which are connected to the preferably elbow-shaped rockably mounted adjusting lever $h, f$ which is fulcrumed on the shaft $e$. The slides or bars $d$ are, moreover, influenced by the spring $g$ in engagement therewith.

Below the counterroller $c$ the strewing or distributing roller $k$ is disposed which is provided with longitudinal ribs or projections $l$ extending in a parallel direction or at an inclination to the axis. The arrangement of the distributing roller $k$, as appears from the drawing is such that it is mounted at a somewhat lower level than the discharging roller $b$, the ribs being so arranged that their outer edges extend up to the periphery of the discharging roller $b$. These outer edges are serrated, as shown in Figure 2, and the teeth or gaps of the teeth are preferably alternatingly or staggeringly arranged with relation to each other. Underneath the nib of the strewing and discharging rollers a preferably substantially trough-shaped shield acting as a wiper or scraper $i$ is mounted adapted to guide the material in its descent.

The fertilizing material contained in the hopper or receptacle $a$ is carried along in the direction of the arrow (Figure 1) by the roller $b$, slowly rotating with, say, about one revolution a minute and at the point of discharge it is seized by the counterroller $c$ and may be crushed between the rollers. The counterroller $c$ may be adjusted by the hand lever $h$, so as to vary its distance from the discharge roller $b$ in accordance with the nature of the fertilizing material. Moreover, the arrangement is such that the roller $c$ by the action of the spring $g$ which bears against the bearings of the member $d$ may automatically adjust itself towards or away from the discharge roller $b$ during the operation, and independently on any preliminary adjustment. In view thereof, the counterroller $e$ is adapted to spring actingly yield on its bearings in one or both directions, whenever required, as is for instance the case with material of lumpy condition. Such agglomerated portions of the fertilizing material are crushed likewise between the rollers in the discharging operation.

The ejected fertilizing material drops onto the longitudinal or inclined or helically or otherwise suitably arranged ribs $l$ of the strewing or distributing roller $k$. Inasmuch as this roller is rotated at a multiple of the speed of the discharge roller $b$, thus, for instance, if required, at a speed of 150 to 300 revolutions a minute, comparatively small individual portions of the fertilizing material are caught by the ribs or projections of this distributing roller $k$, and are downwardly ejected in a finely distributed condition. With this end in view the particular arrangement of the strewing or distributing roller shown in the drawings is of importance. In the case of fertilizer of moist, sticky or similar nature the material is liable to adhere at its escape more or less to the periphery of the discharging roller. In this case by the rapid sweeping movement of the outer edges of the longitudinal ribs $l$ past the outer surface of the roller $b$ provision is made for the complete removal and ejection of any adhering fertilizer. The intended fine distribution and trituration of the material is greatly assisted and increased by the serrated formation of the outer edges of the longitudinal ribs $l$, the teeth being preferably alternatingly disposed. With this arrangement different portions of the serrated projections are made to engage with the surface of the discharging roller in quick succession, and alternatingly in the succeeding rows during the rapid rotation of the distributing roller $k$, which results in an excellent grinding and disintegrating action even in the case of caking fertilizer material. The action of the teeth is somewhat similar to that of a shaping or similar machine.

The curved or substantially trough-shaped shield $i$ surrounding a portion of the distributing or strewing roller $k$ assists in obtaining the distributing and spreading action, and is at the same time operative to obviate any premature escape of portions of the fertilizer, and causes the ejection to take place in a certain definite direction. Furthermore than that, the upper edge of the trough or shield $i$ acts to scrape off the discharging roller $b$, so as to complete and assist the detaching and distributing action of the strewing or distributing roller. The shield or trough $i$ may be rigidly, or adjustably, or spring-actingly mounted. As herein shown, the distributing or strewing roller $k$ is completely exposed, so as to be easily accessible, and there is no likelihood of portions of material adhering and remaining on its surface. The discharging rollers $b$ and $c$, as well as the distributing roller $k$ may each be made of one piece only and may extend the full width of the machine; or the rollers may consist of two or more sections engageable with each other along a part of their length.

The teeth illustrated in Figure 2 of the drawing may be situated in the plane of the longitudinal ribs or they may be twisted more or less, so as to be inclined with relation thereto. By this twisting arrangement the result may be obtained that the machine becomes also adapted to strew sideways, that is to say, it will cover a surface with fertilizer in excess of its track width. Directly underneath the point of cooperation of the discharging roller with the counterroller $c$ means may be provided to act as scraping or wiping agents, and shown, for instance, at $t$ in Figure 3 of the drawing.

In this Figure 3 a somewhat modified construction is shown of the discharging end of the machine. In this modification the scraper $t$ above referred to, and disposed underneath the nib or the cooperating point of the roller $b$ and $c$ is engageable with the discharging roller $b$. It may comprise a narrow strip of sheet iron or a wire in engagement with the discharging roller for its whole length. This scraper is operative to cause the bulk of the fertilizer to become detached from the discharging roller $b$ and to be dropped therefrom at the proper time.

The longitudinal comminuting ribs $l$ of the strewing roller $k$ in this modification may be inclined relatively to the radius by an angle $\alpha$, so as to be inclined in the direction of movement. Moreover, the outer edges of these longitudinal ribs $l$ may be sharpened, these arrangements accomplishing the novel result that the fertilizing material dropped onto the shield or trough $i$ is carried away with a cutting action, so that the material is not only subject to a pushing movement, as set forth with reference to Figure 1, but to an additional slicing or cutting action as well with the advantage of preventing particularly sticking and adhering fertilizer from becoming deposited on the trough $i$. Such fertilizer is completely removed without residue by the longitudinal ribs $l$ by a kind of planing or shaping action, and in this modification likewise the outer edges of the longitudinal ribs $l$ may be alternatingly or staggeringly indented, as shown in Figure 2 of the drawing.

The escape of the fertilizing material from between the shield and the rollers is furthermore greatly facilitated by suitable knocking and shaking means, shown by way of example in Figure 2 and comprising an elbow lever $p$, $r$ with a kind of bell-crank action the legs $p$ and $r$ of which are rigidly connected to each other and fulcrumed at the point $o$ on a stationary stub. The lever $p$ is suspended by means of a spring $s$ and is disposed within the path of the movement of the lug or cam $q$ adapted to rotate on the shaft of the strewing roller $k$. To the free end of the lever $r$ a hook-shaped or similar knocker $v$ is secured. This part of the device operates by the rotation of the cam or lug $q$ incident upon the rotation of the distributing or strewing roller $k$ being caused to knock once in each revolution against the lever $p$. By this means the elbow lever $p$, $r$ is oscillated and the spring $s$ is charged. At the moment in which the lug $q$ becomes free of the lever $p$ and releases the same the lever $p$ under the influence of the spring $s$ is rapidly pulled back, causing the knocker $v$ at the end of the lever to strike against the underside of the shield or trough $l$ which is thereby violently vibrated, thereby avoiding the possibility of sticky portions of the fertilizer becoming attached to the shield or trough $i$. It is obvious that a variety of knocking levers $r$ may be provided below the trough the number of which may be governed by the length of the shield $i$. A series of knocking levers $r$ may be operated by a single lever $p$ or by a single cam or lug $q$. When it is desired to disengage the knocker it is only necessary to disengage the hook-shaped end of the lever $p$ from the spring $s$ or to detach the spring $s$. The tension of said spring may be adjustable. It should be understood that these are not the only modifications to which the invention is susceptible, but various other alterations and modifications may suggest themselves to the expert in accordance with varying conditions of application and the nature of the product and without deviating from the spirit and scope of the invention as hereinafter defined in the appended claims.

I claim:—

1. In a fertilizer strewing machine and the like the combination with a container and a pair of spacedly disposed, parallel, rotatable feeding and crushing rollers of different diameted at the open bottom of the container, of rotatable delivery and ejecting means below the axial plane of the rollers and opposite the space between the same, and a shield adjacently surrounding part of the bottom portion of the delivery and ejecting means and extending within close proximity of the larger rotatable feeding and crushing roller.

2. In a fertilizer strewing machine and the like, a downwardly open feeding container, a rotatable crushing roller of relatively large diameter closing part of the open bottom of the container, a crushing roller of relatively small diameter at said open bottom and in spaced parallel relation to the upper half of the roller of larger diameter, a rotatable delivery and ejecting roller below the axial plane of the crushing rollers and below the crushing roller of smaller diameter and substantially opposite the space between the crushing rollers, a plurality of relatively angularly and axially disposed longitudinally and alternatingly serrated peripheral projections on said delivery roller, and a guiding shield surrounding part of the bottom portion of the delivery roller adjacent the serrated projections and extending within close proximity of the crushing roller of large diameter.

3. In a device of the character described, a delivery roller, a plurality of axially extending, spaced parallel lengthwise alternatingly serrated projecting ribs on said roller, co-directionally inclined from the radial direction, and loosening and guiding means for the material below said roller and co-operating therewith.

4. In a device of the kind described, a delivery roller, a plurality of substantially lengthwise serrated rows of projections on said roller, a guide shield, closely adjacent said projections and surrounding part of the delivery roller, a rockingly disposed knocker cooperated with said shield and adapted to vibrate the shield, and means on the roller for operating said knocker.

5. In a device of the kind described, a delivery roller, a plurality of substantially lengthwise serrated rows of projections on said roller, a guide shield, closely adjacent said projections and spacedly surrounding part of the lower portion of the roller, a knocker, cooperating with the shield and adapted to vibrate said shield upon the engagement therewith, a spring means for operating said knocker, and means on the roller operatively engageable with the lever for vibrating said shield.

6. In a device of the kind described, a rotatable roller, a plurality of substantially lengthwise and alternatingly serrated projecting ribs on said roller, peripherally inclined from the radial direction, a guide shield, closely adjacent said serrated ribs, a substantially bell-crank shaped knocker engageable with the shield and adapted to vibrate said shield upon the engagement therewith, and means on the roller operatively engageable with the knocker upon the rotation of the roller.

AUGUST WILHELM KOCH.